No. 806,435. PATENTED DEC. 5, 1905.
M. B. SCHENCK.
SHEET METAL ROLLER BEARING FURNITURE CASTER.
APPLICATION FILED MAR. 14, 1905.
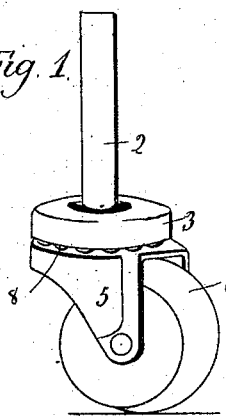
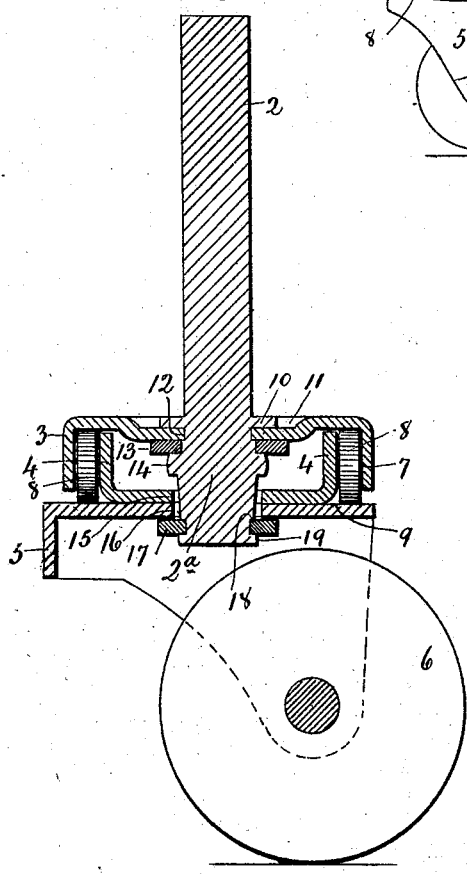
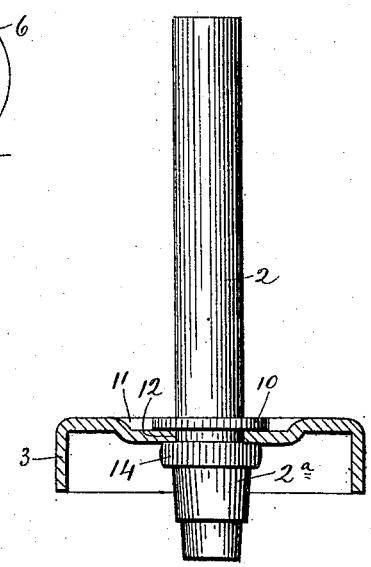
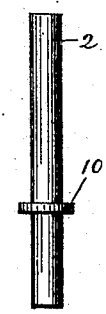
Martin B. Schenck.
Inventor.

UNITED STATES PATENT OFFICE.

MARTIN B. SCHENCK, OF MERIDEN, CONNECTICUT.

SHEET-METAL ROLLER-BEARING FURNITURE-CASTER.

No. 806,435.        Specification of Letters Patent.        Patented Dec. 5, 1905.

Application filed March 14, 1905. Serial No. 250,013.

*To all whom it may concern:*

Be it known that I, MARTIN B. SCHENCK, a citizen of the United States, residing at Meriden, in the county of New Haven and State of Connecticut, have invented a new and useful Improvement in Sheet-Metal Roller-Bearing Furniture-Casters; and I do hereby declare the following, when taken in connection with the accompanying drawings and the figures of reference marked thereon, to be a full, clear, and exact description of the same, and which said drawings constitute part of this specification, and represent, in—

Figure 1, a perspective view of a caster constructed in accordance with my invention; Fig. 2, an enlarged view thereof in vertical section; Fig. 3, an enlarged view showing another way of securing the outer cup to the long pintle; Fig. 4, a detached view of the long pintle in its initial form.

My invention relates to an improvement in sheet-metal roller-bearing furniture-casters, the object being to produce at a low cost for manufacture a simple, light, compact, and very strong article.

With these ends in view my invention consists in a caster having certain details of construction and combinations of parts, as will be hereinafter described, and pointed out in the claims.

In carrying out my invention as herein shown I employ a long pintle 2, having an integral stud $2^a$ at its lower end, an inverted sheet-metal outer cup 3, a sheet-metal inner cup 4, and a sheet-metal wheel-frame 5, in which a wheel 6 is mounted. The cups 3 and 4 are sufficiently differentiated in diameter for the production between them of an annular runway 7, receiving a series of flat sheet-metal rollers 8, which travel upon the flat bearing-face 9 of the wheel-frame 5 and upon the bottom of the outer cup 3. In its initial form the long pintle 2 has an annular flange 10, located between its lower end and its stud $2^a$ and adapted to enter a recess 11, formed in the upper face of the outer cup 3 and concentric with the stud-hole 12 thereof. After the stud $2^a$ has been passed through the said stud-hole 12 a reinforcing-washer 13 is applied to the said stud, the projecting end of which is then "backset" against the washer, so as to form a heavy annular backset-flange 14, whereby the outer cup 3 and the washer 13 are firmly gripped between the flanges 10 and 14, aforesaid. Under this construction the outer cup is virtually made solid with the pintle and reinforced by the washer 13. In "backsetting" the stud $2^a$ it is "thickened up," so to speak, and also given a somewhat tapering form. The stud is then passed through the stud-hole 15 of the inner collar 4 and the stud-hole 16 of the wheel-frame 5. A retaining-washer 17 is then applied to the projecting end of the stud and brought to a bearing upon a shoulder 18, formed thereon at the time of backsetting it. The extreme outer end of the stud is then upset against the retaining-washer 17 to form a head 19, whereby the said washer is secured in place. The cup 4 and the wheel-frame 5 are thus retained upon the stud on which the frame 5 must be free to swivel. As to the cup 4, that may be made to swivel or not, as desired. Its function is merely that of a ring to form the inner wall of the runway 7 and is, in effect, an inner runway-piece.

In the modified construction shown by Fig. 3 of the drawings the reinforcing-washer 13 is omitted and the stud $2^a$ backset, so as to seat the annular backset-flange 14 directly upon the inner face of the outer cup 3, which is thus gripped between the said flange 14 and the flange 10. This construction which omits the washer is of course cheaper and may be adopted in casters of small size or casters for use in situations where the weight they are to carry is not of the heaviest.

In view of the modification shown and described and of others which may obviously be made I would have it understood that I do not limit myself thereto, but hold myself at liberty to make such departures therefrom as fairly fall within the spirit and scope of my invention. Thus, if desired, the inner cup 4 may also be inverted.

Having fully described my invention, what I claim as new, and desire to secure by Letters Patent, is—

1. In a sheet-metal roller-bearing furniture-caster, the combination with an inverted cup, of an inner runway-piece enough smaller than the said cup to form a runway, a wheel-frame, rollers located in the said runway and bearing in the said cup and upon the said wheel-frame, and a long pintle having an annular flange for engagement with the upper face of the cup, and also formed at its lower end with a stud which latter is "backset" to form an annular flange which coacts with the other flange in binding the pintle and cup together, and the said stud being also "backset" to form a shoulder; and a retaining-washer seated against the said shoulder and engaging with the wheel-frame which it holds upon the said stud.

2. In a sheet-metal roller-bearing furniture-caster, the combination with an inverted cup, of an inner runway-piece enough smaller than the said cup to form a runway, a wheel-frame, rollers located in the said runway and bearing in the said cup and upon the said wheel-frame, a reinforcing-washer placed upon the bottom of the cup, and a pintle having an annular flange for engagement with the upper face of the cup and also having at its lower end a stud which latter is "backset" against the said washer to form an annular flange whereby the cup is rigidly secured to the pintle, and the said stud being also passed through the said wheel-frame which is swiveled upon it.

3. In a sheet-metal roller-bearing furniture-caster, the combination with an inverted outer cup, of an inner cup enough smaller than the same to form a runway, a wheel-frame, rollers located in the said runway and bearing in the said outer cup and upon the said wheel-frame, and a long pintle having an annular flange for engagement with the upper face of the outer cup and also formed at its lower end with a stud which latter is "backset" to form an annular flange which coacts with the other flange in binding the pintle and outer cup together, and the said stud being also "backset" to form a shoulder; and a retaining-washer seated against the said shoulder and engaging with the wheel-frame which it holds upon the said stud.

In testimony whereof I have signed this specification in the presence of two subscribing witnesses.

MARTIN B. SCHENCK.

Witnesses:
CLARA L. WEED,
GEORGE D. SEYMOUR.